May 24, 1966     D. H. POLZIN     3,252,555
MATERIAL DISTRIBUTOR

Original Filed Dec. 20, 1963     2 Sheets-Sheet 1

INVENTOR.
DONALD H. POLZIN
BY
*John C. Thompson*
ATTORNEY

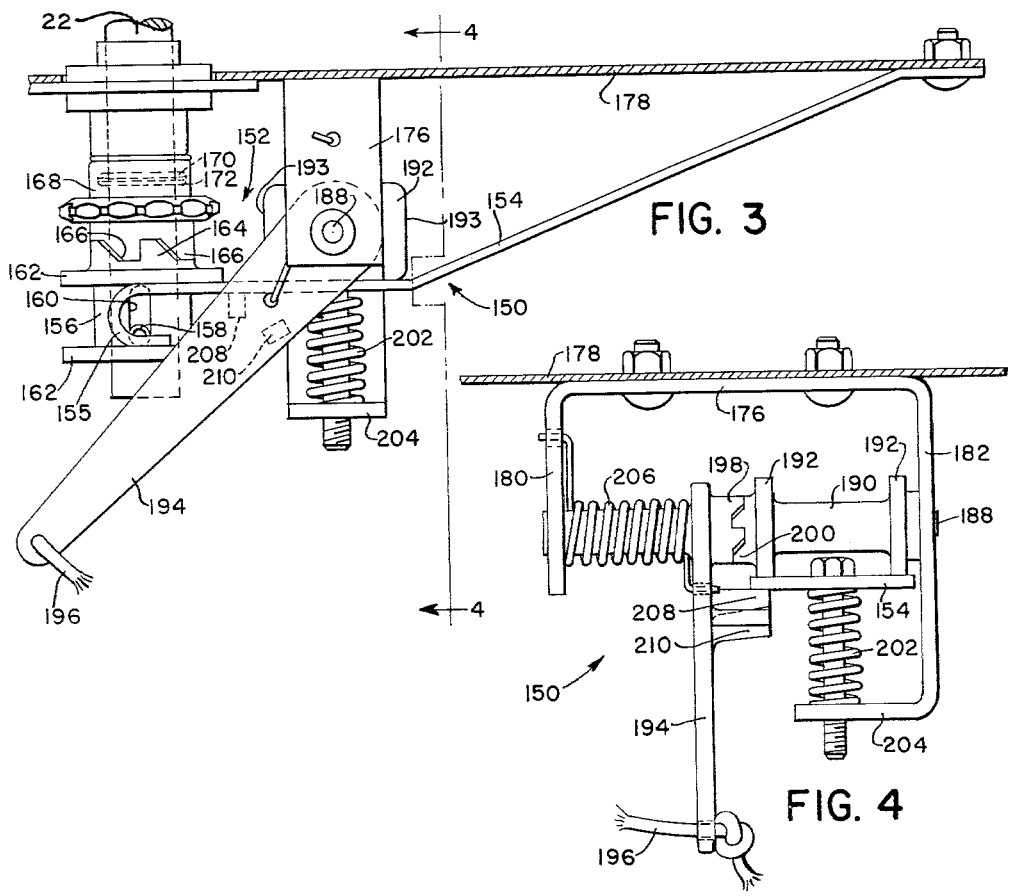
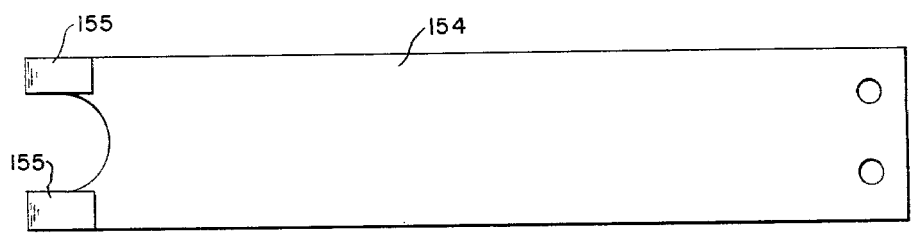

United States Patent Office 3,252,555
Patented May 24, 1966

---

3,252,555
MATERIAL DISTRIBUTOR
Donald H. Polzin, Horicon, Wis., assignor to Deere & Company, Moline, Ill., a corporation of Delaware
Original application Dec. 20, 1963, Ser. No. 332,192. Divided and this application May 28, 1964, Ser. No. 370,879
1 Claim. (Cl. 192—92)

The present invention relates generally to material distributors, and more particularly to broadcast spreaders adapted to be propelled forwardly over the surface of the ground and to discharge agricultural and other materials onto the ground.

This application is a divisional of applicant's copending application Ser. No. 332,192, filed December 20, 1963.

It is a principal object of the present invention to provide an improved conveyor clutch and throwout mechanism which can easily be thrown in or out of engagement while the machine is in forward motion.

More particularly, it is an object of the present invention to provide a conveyor clutch and throwout mechanism that is operable while the input shaft is being rotated.

A further object of the present invention is to provide a clutch throwout mechanism which is operable merely by pulling a trip rope, the mechanism not recycling either in or out of engagement until the rope is released and then pulled again.

These and other objects and advantages of this invention will be apparent to those skilled in the art after a consideration of the following detailed description, taken in conjunction with the accompanying drawings, in which the preferred form of this invention is illustrated.

FIG. 3 is a top view of the conveyor clutch and throwout assembly.

FIG. 4 is a side view of the throwout mechanism.

FIG. 5 is a view showing the lever which interconnects the throwout mechanism with the clutch.

In the following description right-hand and left-hand reference is determined by standing to the rear of the broadcast spreader and facing the direction of travel.

*In general*

Figure 2:
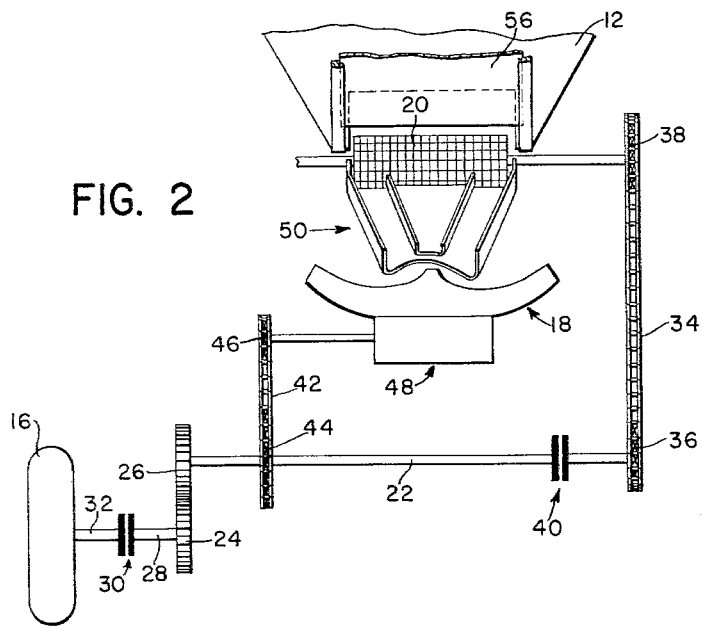
FIG. 2 is a schematic rear view of the drive system for applicant's spreader.
Figure 1:
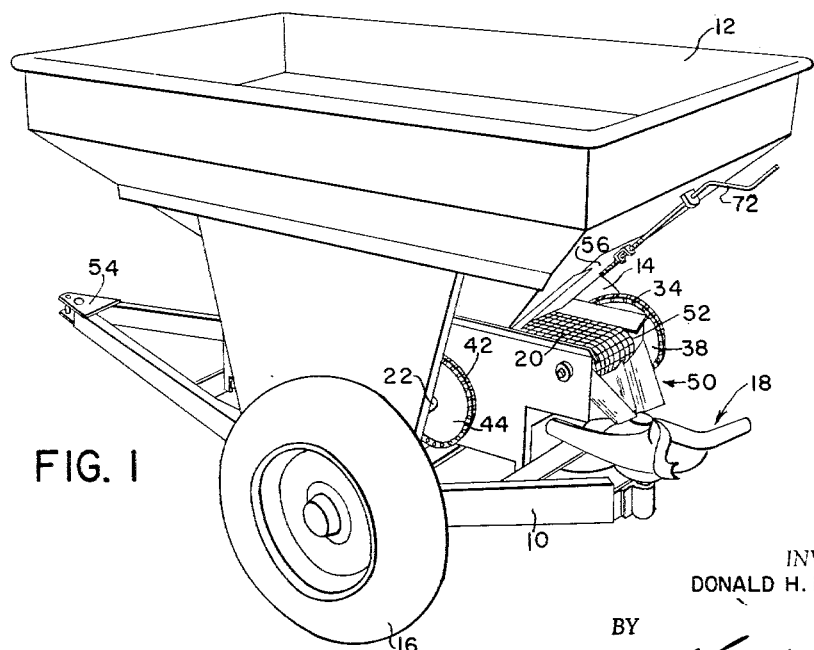
FIG. 1 is a perspective view of the spreader of the present invention.

The broadcast spreader of the present invention, as best shown in FIG. 1 and schematically in FIG. 2, includes a frame or chassis 10 having mounted thereon a material hopper 12. The chassis is supported by right- and left-hand wheels, the left-hand wheel 16 being adapted to drive a spinner 18 and a chain belt conveyor 20 in the bottom of the hopper 12. To this end, the wheel 16 is drivingly interconnected to a jackshaft 22 through gears 24, 26, drive member 28, and a main throwout or ratcheting clutch assembly 30 on the axle 32. The jackshaft 22 is in turn connected through chain 34, sprockets 36, 38, and a clutch and throwout assembly, indicated generally at 40, with the chain belt conveyor; and the jackshaft 22 is also connected through chain 42, sprockets 44, 46, and a governor controlled variable speed transmission 48 to the spinner 18. Disposed between the apron 52 of the conveyor 20 and the spinner 18 is a chute 50.

*Operation*

To operate applicant's broadcast spreader it is only necessary to fill the hopper 12 with the material to be spread, to secure the nosepiece 54 of the frame or chassis 10 to any tractor or truck and to draw the spreader (with both clutches engaged) over the area to be spread, the gate 56 being opened to the desired amount by crank 72.

Applicant's chute 50 and spinner 18 are so designed that the material to be discharged is deposited on the spinner in such a manner, and the spinner discharges the received material in such a manner, that as the spreader is drawn down a field the rate of application will be even across the field.

*Clutch and throwout construction*

Applicant has found that for best results it is necessary to employ a separate conveyor clutch 40 as well as a main throwout clutch 30. Thus when the spreader is transported for long distances or at high speeds the main clutch 30 is disengaged; however when spreading in the fields the main clutch is maintained in its engaged position while the conveyor clutch 40 is employed to control spreading. If only the clutch 30 were employed after disengaging the drive, considerable material would dribble from the apron portion of the conveyor onto the spinner during short transport due to bouncing of the machine. Thus, when starting again with the clutch engaged, this collection of material would be thrown off at a short radius and leave streaks of very dense application. This would be disadvantageous in that it could be injurious to both crops and grazing animals as well as resulting in inefficient use of material. The rope operated clutch and throwout assembly 40, which will be described in detail below, is employed to overcome the foregoing disadvantages and to provide a mechanism which can easily be thrown into or out of engagement while the machine is in forward motion to permit leaving a "headland" when fertilizing or seeding, and to control spot applications when desired.

The conveyor throwout clutch assembly 40 is illustrated in FIGS. 3, 4 and 5 and includes a rope controlled cam operated throwout mechanism, indicated generally at 150, for engaging and disengaging the spool clutch, indicated generally at 152, through means of throwout yoke or lever 154 made of spring steel and normally biased inwardly towards the wall member 178. One end of lever 154 is secured to wall member 178 as by a bolt. This secured end of the lever flexes during opening of cam 192 and comprises pivot means.

The spool clutch includes a spool member 156 which is slidably but non-rotatably held on the jackshaft 22 by means of a roll pin 158 which engages a slot 160. The spool 156 is further provided with radially outwardly extending ribs 162 between which the ends 155 of the yoke 154 are disposed. The teeth 164 of spool 156 are adapted to engage the teeth 166 of the sprocket members 168. The member 168 is held rotatably on the shaft 22 by means of a roll pin 170 which engages a groove 172.

The throwout mechanism 150 is composed of a bracket 176 which is secured to a side wall 178 of the spreader in any conventional fashion. The upper and lower outwardly extending portions 180 and 182, respectively, are apertured, and rotatably receive therein a rod 188. Pinned to the rod is a cam 190 having upper and lower lobes 192 which contact the lever or yoke 154. Disposed between the cam 190 and the upper portion 180 is the throwout arm 194 which is adapted to be controlled by the operator of the spreader through means of a control rope 196. The hub portion of the arm is provided with ratching teeth 198 that are adapted to engage teeth 200 on the cam whereby the cam can be indexed 90° at a time.

A spring 202 is disposed between an upturned portion 204 of the lower portion 182 and the yoke 154 and normally aids in holding the yoke in firm engagement with the lobes 192. As can best be seen from FIG. 3 the lobes are generally rectangularly shaped. Thus the teeth 164 and 166 will snap into engagement when the smaller sides 193 are rotated slightly past full or flush engagement with the yoke 154.

A spring 206 is provided to return the arm to its normal position shown in FIG. 3, and stops 208 and 210 are adapted to cooperate with the yoke 154 to limit the swinging movement of the arm 194, stop 208 contacting the lever 154 when the arm 194 is in its rearward position as shown in FIG. 3, and the stop 210 contacting the lever 154 when the arm 194 is in its forward position.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

I claim:

A clutch throwout mechanism for a spreader conveyor comprising: a support, a rod carried by said support, a cam of generally rectangular configuration rotatably carried on said rod, said cam having two generally parallel small sides and two generally parallel large sides, lever means having a first portion engageable by one of said sides, said lever means having a second portion adapted to engage a spool clutch, pivot means carried by said support, said lever means having a third portion secured to said pivot means, means actuatable to cause the cam to be rotated, said means comprising an arm having a hub portion rotatably disposed about said rod, means on said hub portion engageable with said cam to cause said cam to be rotated in response to forward movement of said arm, biasing means operable on said lever to cause said lever to normally engage one of said cam faces, spring means engageable with said arm and said support means to normally hold said arm in one position, and stop means on said arm cooperable with said lever means to limit forward movement of said arm to substantially 90°.

References Cited by the Examiner
UNITED STATES PATENTS

| | | | |
|---|---|---|---|
| 2,352,596 | 7/1944 | Bartlett et al. | 192—89 |
| 2,517,744 | 8/1950 | Wallach et al. | 192—89 |
| 2,648,984 | 8/1953 | Olander | 74—96 |
| 2,658,396 | 11/1953 | Christiance | 192—92 X |
| 2,685,356 | 8/1954 | Bjerkan | 193—93 X |

DAVID J. WILLIAMOWSKY, *Primary Examiner.*

DON A. WAITE, *Examiner.*

B. WYCHE, *Assistant Examiner.*